Jan. 14, 1930. J. M. SCHUTTE Re. 17,564
TOY AEROPLANE
Original Filed Oct. 8, 1927 2 Sheets-Sheet 1
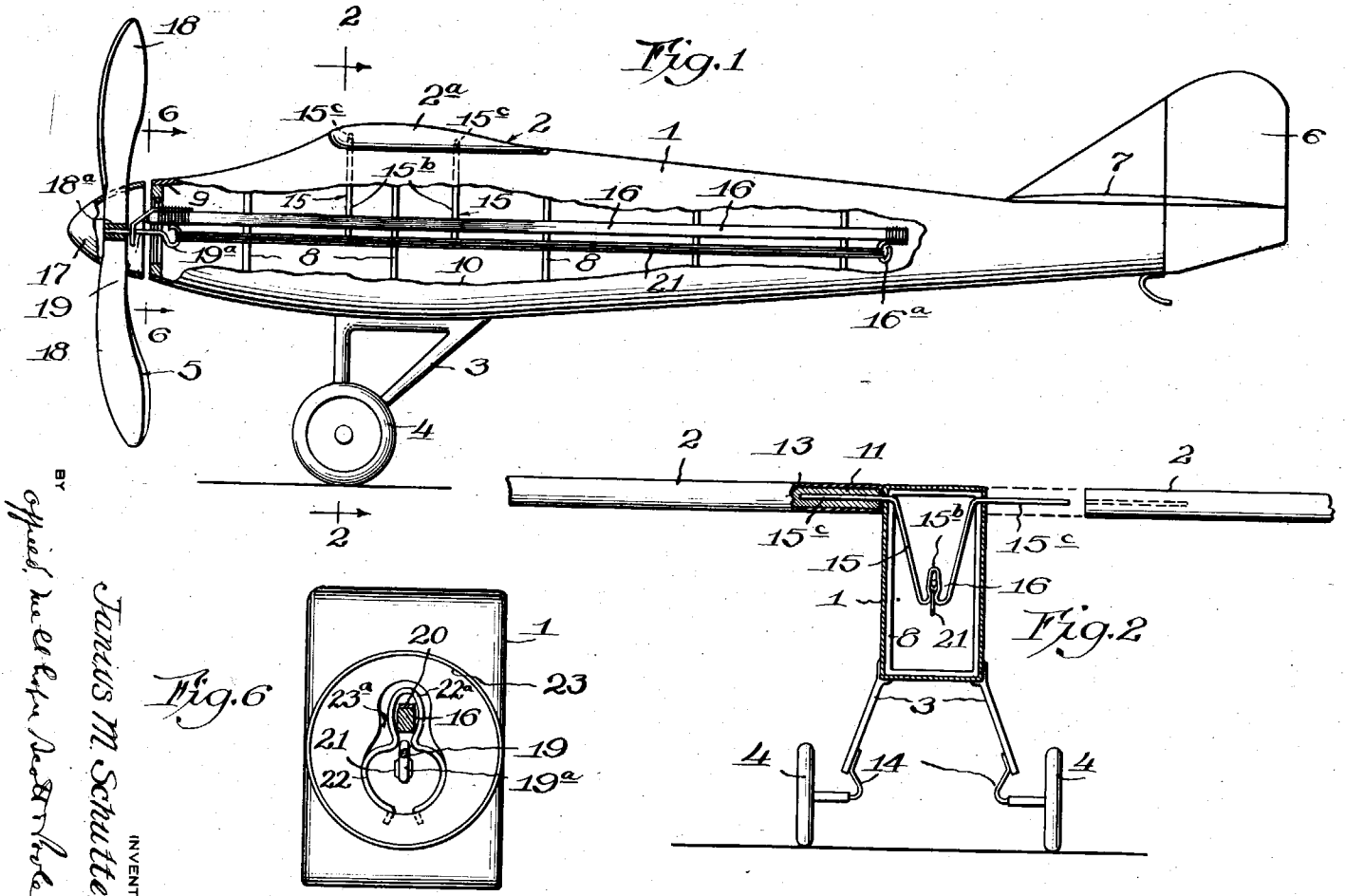
INVENTOR
Janius M. Schutte,
BY
Offield, Mellen, Fosse, Scott & Poole
ATTORNEYS.

Jan. 14, 1930. J. M. SCHUTTE Re. 17,564
TOY AEROPLANE
Original Filed Oct. 8, 1927 2 Sheets-Sheet 2
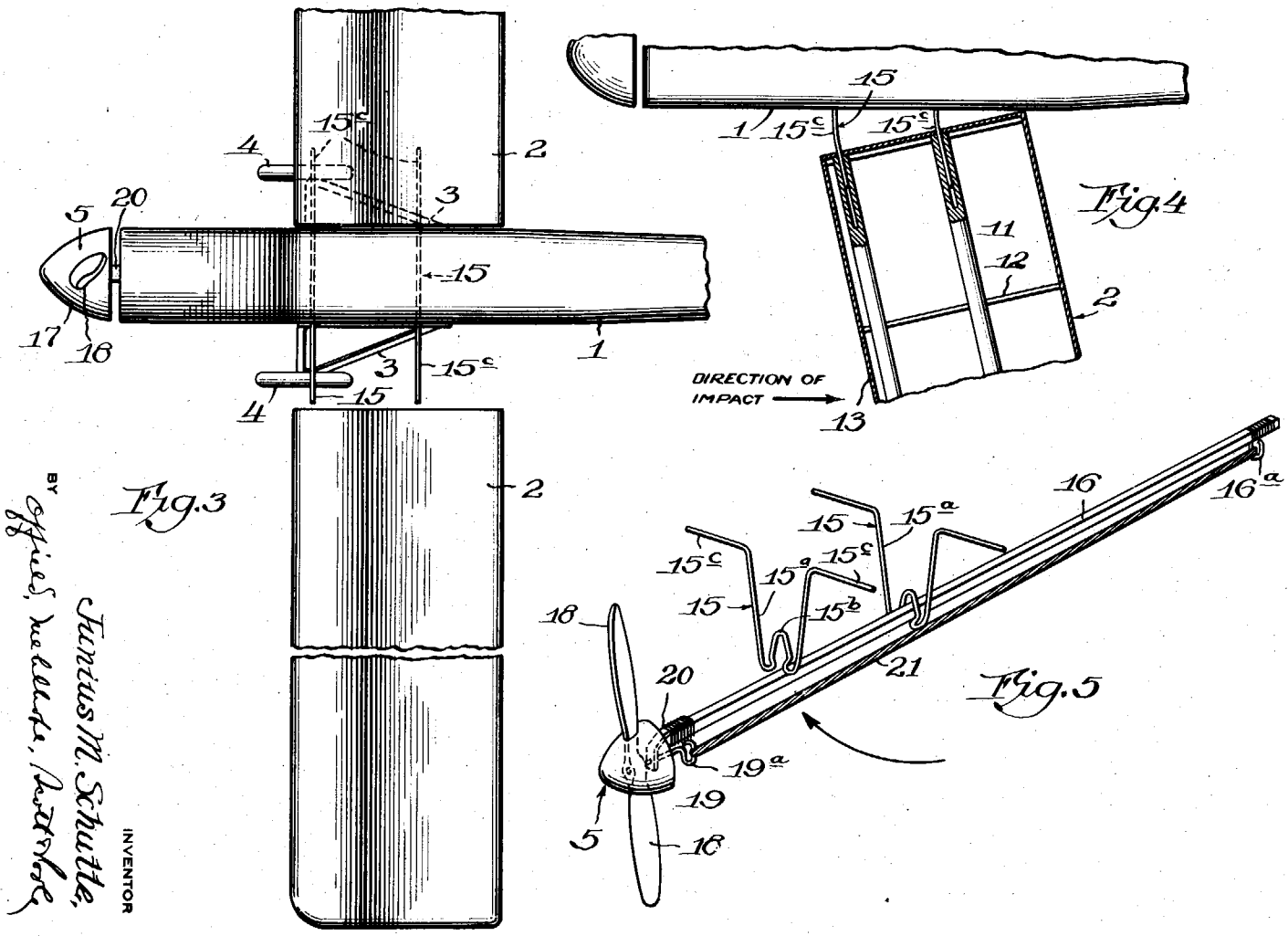
INVENTOR
Junius M. Schutte,
BY Offield, Mehlhope, Scott & Hoole
ATTORNEYS Reissued Jan. 14, 1930

Re. 17,564

UNITED STATES PATENT OFFICE

JUNIUS M. SCHUTTE, OF CHICAGO, ILLINOIS, ASSIGNOR TO THE AERO MODEL COMPANY, OF CHICAGO, ILLINOIS, A CORPORATION OF ILLINOIS

TOY AEROPLANE

Original No. 1,723,446, dated August 6, 1929, Serial No. 224,779, filed October 8, 1927. Application for reissue filed October 25, 1929. Serial No. 402,512.

This invention relates to improvements in toy aeroplanes and more particularly to miniature or model planes, designed and constructed in accordance with the recognized standards of aeronautic practice and capable of leaving the ground and maintaining sustained flight under their own power for a period of appreciable duration.

The object of the invention is to provide a practical and useful article for amusement and experiment, which may be likened more to a model than a toy, since it embodies much of the structural detail of a full-sized plane and combines the lightness and balance necessary for flight, and, in spite of its fragile appearance, is constructed in such a way as to be capable of surviving, without damage, the impacts received incident to landing and contact with objects encountered in flight.

A further object of the invention is to provide new and novel means for propelling the plane including a propeller and tension bands connected with the propeller, all combined into a unit designed to be detachably and removably supported within the plane fuselage.

The novel features of the invention are disclosed in the accompanying drawings of a miniature plane of the monoplane type.

In the drawings,

Figure 1 is a view in side elevation of the plane, with portions broken away to show the structure.

Figure 2 is a view in vertical section as taken on line 2—2 of Figure 1.

Figure 3 is a top plan view of the plane showing one of the wings detached.

Figure 4 is a detail view showing the construction of the wings and the manner in which the same are detachably connected with the fuselage.

Figure 5 is a perspective view of the propelling unit and the members for supporting the same within the body of the plane, and Figure 6 is a view in front elevation of the plane showing the construction of the nose as taken on line 6—6 of Figure 1.

As heretofore suggested, the design and construction of the model resembles closely that of a full-sized plane, in so far as possible. The principal elements are the fuselage or body 1, the wings 2, 2 extending from the sides of the fuselage, landing struts 3, 3 extending downwardly from the fuselage and equipped with wheels 4, 4, a propeller 5 at the forward end, and the vertical and lateral rudders 6 and 7 at the rear end of the fuselage. The rudders are fixed, although they can be warped if desired, to control the flight.

In the preferred embodiment, the construction and design of the wings follow closely the standard practice in aeroplane design although a less costly construction can be used. As shown, these parts consist of a skeleton frame work covered with a light fibrous material of a suitable kind and quality. The fuselage 1 is a hollow elongated body with the familiar stream line shape and is made of a plurality of transverse frame members 8 of wood or other fibrous material, and spaced apart at intervals from end to end. These frame members are generally rectangular in shape but vary in size to conform to the sectional contour of the body at the several points where these members are located. There are also longitudinal frame members 9 connecting the transverse members, and complete the skeleton frame over which the covering or skin 10 is applied.

The wings 2, 2 are constructed in somewhat the same manner, consisting of skeleton frames of longitudinal strut members 11 of light strips of wood and the transverse sections 12 of the same or other suitable material (Figure 4). A covering 13 of thin fibrous material is applied over the wing frames as in the case of the fuselage. As thus constructed the fuselage and wings are exceedingly light and strong, both being essential to sustain flight and durability.

The landing chassis consists of the struts 3 and wheels 4 together with intermediate shock absorbers which will be presently described. The struts 3, 3 are preferably in the form of open triangular shaped frames secured to the under side of the fuselage and extend downwardly with a slight lateral divergence as shown in Figure 2. The lower ends of the struts terminate in a point or apex to which are fastened, as by binding, two pieces of resilient wire 14, 14 bent somewhat in L-shape with appreciable inwardly extending loops or U-shaped portions intermediate their ends. The free ends of these wires extend horizontally in an outward direction and form the axles for the wheels 4, 4. These wires 14, 14 act as shock absorbers in yieldably resisting the impact of the wheels in contact with the ground on landing, and thus saves the body from possible damage.

The wings 2, 2 are detachable from the fuselage, being fastened thereto by two wire supporting members 15, 15 which also serve to support the propelling unit, as will hereinafter be described. These supporting members are preferably lengths of relatively stiff wire bent into the shape shown in Figure 5, namely, with a central U-shaped portion $15^a$ having a downwardly opening clip $15^b$ at its lower end, and a pair of laterally projecting ends $15^c$, $15^c$ extending in opposite directions from the upper extremities of the central U-shape portion. These supporting members are securely fastened within the fuselage in spaced relation from front to rear and a short distance rearwardly of the front end, with the U-shape portion depending into the hollow interior of the fuselage as clearly shown in Figure 2.

The end portions $15^c$, $15^c$ or the supports 15, 15 project laterally through laterally facing abutment plates $2^a$, $2^a$ forming a part of the fuselage and having a shape corresponding to the sectional contour of the wings. The inner ends of the wings abut against these plates $2^a$ and the projecting ends $15^c$, $15^c$ one near the forward edge and the other spaced rearwardly, engage sockets bored or drilled into the longitudinal frame members or struts 11 of the wings, as shown in Figure 4. These sockets or bores are of a size and depth to receive the projecting ends $15^c$, $15^c$ with a snug fit, so that when the wings are applied they are held securely, but capable of removal. This method of attachment is used, first, for convenience in removing the wings for handling and shipment, and, second, to lessen the danger of breakage in case the wings strike the ground on landing or an obstacle during flight. The action of the wing supports in the event of collision is shown in Figure 4, and illustrating the manner in which the rods will bend and pull out of their sockets in the wing struts in case of an impact in the direction indicated. In case the impact is but slight the wings will yield rearwardly at a slight angle, thus absorbing the shock without damage, whereas a severe impact may cause the wings to be completely detached from the fuselage, but without suffering any particular injury.

Referring now to the propelling mechanism, Figure 5, this device, as before explained, is a unit separate from the plane and consists of a light stick of wood 16 somewhat shorter than the fuselage, with the propeller 5 rotatably mounted at its forward end. The propeller preferably consists of a conical shell 17 with radial blades 18 of suitable material such as celluloid extending transversely therethrough. At the middle of the propeller is a hub $18^a$ within the shell and having an axial bore in which is secured one end of a rod or propeller shaft 19, extending axially from the open end of the shell and terminating a short distance beyond in a loop or eye $19^a$. At the forward end of the stick 16 is a bearing arm 20 bound or otherwise attached thereto. This arm is bent beyond the end of the stick at right angles and has a hole drilled at its end through which the shaft 19 passes and in which it turns. At the rear or opposite end of the stick 16 is a hook $16^a$ over which is looped one end of one heavy or several light rubber bands 21, which supply the motive power for rotating the propeller. The other end of the elastic propelling band passes through the loop $19^a$ at the end of the propeller shaft 19, this being preferably a permanent connection, whereas the connection at the opposite end is detachable.

The propelling device consisting of the parts above described forms a self-contained unit which is detachably held in the fuselage in the following manner: At the forward end of the fuselage is a supporting member 22 not unlike the supports 15, 15, already described. This supporting member (Figure 6) consists of a wire bent so as to form a resilient U-shaped clip $22^a$ secured within an opening $23^a$ in the front section 23 of the fuselage, the clip facing downwardly toward an enlarged portion of said opening through which the stick 16 is inserted, before it is forced upwardly into the clip.

The supporting members 15, 15 have a similar arrangement in the downwardly opening clip portions $15^b$ which have a restricted entrance through which the stick 16 can be forced to hold the same, as shown in Figure 5. Thus the propelling unit is yieldably held within the fuselage at three points, namely, just rearwardly of the propeller and at points adjacent the central portion of the stick 16.

To prepare the plane for flying, the propelling device is removed from the fuselage and by holding the stick in one hand and turning the propeller with the other, the elastic band is wound up to the desired degree of tightness. Perhaps a better way is to disconnect the rubber bands from the rear end of the stick and twist the same by use of an implement resembling the ordinary egg beater with the shipping blades replaced by a hook. In this way the bands can be wound in much less time and with less effort than by hand. When the bands have been tightly wound and replaced on the stick the same is inserted through the front opening in the fuselage and then forced into the supporting clips, the propeller being held against rotation.

By placing the plane on the ground or other level surface and releasing the propeller the plane will start under its own power, travelling a short distance on the ground and finally rising into the air in flight until the power exerted in the unwinding of the elastic band is exhausted and the plane glides down. To prepare for another flight, the propelling device is removed, rewound and inserted as before.

The advantages of the present construction, therefore, is the novel combination of these features essential to a practical aeroplane model, namely, the ability to withstand impacts incident to flight, and requisite lightness and power to enable it to leave the ground and to remain in the air during a flight of considerable duration. These attributes exist in the plane herein disclosed, not only by virtue of the lightness of construction and materials used, but in the provisions made for minimizing the effects of the impact. In the first place, the wings are readily detachable in the event that they encounter an obstruction, thus reducing the probability of any serious injury or breakage. Secondly, the propeller which would ordinarily be the first to strike the ground is readily unseated with the propeller unit from its support, thus avoiding the severe impact that would result if it were rigidly mounted on the plane. Moreover, the provision of the resilient shock absorbing devices intermediate the wheels and the landing struts serve to cushion the impacts with the ground on landing and thus relieving the plane from the full force of landing impacts. In short, the result attained is that of providing a practical and substantial miniature plane, without sacrificing those qualities necessary for flight.

Having set forth the structure and advantages of an aeroplane model embodying the features of the invention,

I claim:

1. A model aeroplane having a hollow fuselage, and a unitary propelling device adapted to be mounted in said fuselage, and comprising a stick, a bearing at one end thereof, a shaft in said bearing, a propeller fixed to said shaft, an elastic band connected with the free end of said shaft and the free end of said stick, and yieldable fixtures mounted in said fuselage for detachably engaging said stick.

2. A model aeroplane comprising a fuselage open at one end, a propelling unit consisting of a stick adapted to extend lengthwise of said fuselage with an end projecting from the open end thereof, a propeller journalled at the projecting end of said stick, an elastic band attached to the inner end of said stick and connected with the axis of said propeller, and supports mounted at intervals lengthwise of said fuselage and adapted to yieldingly engage said stick.

3. A model aeroplane comprising a fuselage open at its forward end, a propelling unit consisting of a stick adapted to extend lengthwise of said fuselage with an end projecting from the forward end thereof, a propeller journalled at the forward end of said stick, an elastic band attached to the inner end of said stick and connected with the axis of said propeller, and supports mounted at predetermined points within said fuselage and comprising resilient U-shaped clips adapted to engage said stick.

4. A model aeroplane comprising a hollow fuselage, wings detachably mounted on said fuselage, a propelling unit including a stick adapted to extend lengthwise of said fuselage and carrying a propeller at one end thereof, and a member for detachably supporting said wings and propelling unit consisting of a wire anchored in said fuselage and bent to form a resilient U-shaped clip adapted to engage said stick and free end portions projecting laterally from the sides of said fuselage and adapted to engage sockets formed in the abutting ends of said wings.

5. A model aeroplane comprising a fuselage consisting of a hollow skeleton frame, wings extending laterally from said fuselage and having detachable abutting contact at their inner ends therewith, a propelling unit comprising a stick adapted to be removably retained in said fuselage, and supporting members for said wings and propelling unit anchored in said fuselage and consisting of lengths of relatively stiff wire bent to form yieldable clips located within said fuselage and adapted to engage said stick and projecting free end portions extending from the sides of said fuselage and adapted to fit in sockets bored in the ends of said wings.

6. A model aeroplane comprising a fuselage in the form of a hollow skeleton frame consisting of longitudinal members and spaced transverse sections, wings extending laterally from said fuselage and consisting of longitudinal members and wing sections, a propelling unit comprising a stick, a propeller and tension member mounted on said stick, and means for detachably connecting said wings and propelling unit comprising a plurality of wires mounted at predetermined intervals within said fuselage and bent intermediate their ends to form clips adapted to engage said stick and free end portions projecting from opposite sides of said fuselage and adapted to be inserted in bores formed in the longitudinal frame members of said wings.

7. A model aeroplane having a hollow fuselage and a removable self-contained propelling unit comprising a stick adapted to extend longitudinally of said fuselage, and provided with a bearing member at one end thereof, a propeller having a shaft journalled in said bearing, an elastic propelling element secured at one end to said longitudinal member and at its other end to said propeller shaft, and yieldable supporting members mounted within said fuselage and adapted to detachably engage said stick at intervals therealong.

8. In a model aeroplane the combination of a hollow fuselage having a space extending longitudinally thereof and an opening at the nose thereof, a propelling unit comprising a stick, a propeller journalled at one end of said stick, an elastic band having one end connected with said propeller and the other end with the opposite end of said stick, and means at the nose of and within said fuselage for removably supporting the stick of said propelling unit adjacent the nose of and within said fuselage.

9. In a model aeroplane, the combination of a hollow fuselage, having an opening at the forward end thereof, a propelling unit comprising a stick having a propeller journalled at one end an elastic band connected at its ends with said propeller and the other end of said stick, said unit being insertable endwise through the opening at the forward end of said fuselage with said propeller exterior thereof, and means for removably supporting said unit longitudinally of said fuselage.

Signed by me at Chicago, Illinois, this 21 day of October, 1929.

JUNIUS M. SCHUTTE